United States Patent [19]

Thomson

[11] 4,440,277
[45] Apr. 3, 1984

[54] IMPLEMENT CLUTCH AND BRAKE CONTROL

[75] Inventor: Donald W. Thomson, Spokane, Wash.

[73] Assignee: Claude W. Morris, Spokane, Wash.; a part interest

[21] Appl. No.: 310,525

[22] Filed: Oct. 13, 1981

[51] Int. Cl.$^3$ ............................................. B60K 41/24
[52] U.S. Cl. .............................. 192/12 D; 192/18 B
[58] Field of Search ............ 192/12 D, 8 R, 15, 18 B

[56] References Cited

U.S. PATENT DOCUMENTS

| | | | |
|---|---|---|---|
| 2,788,104 | 4/1957 | Mason | 192/12 D |
| 3,228,177 | 1/1966 | Coates . | |
| 3,253,391 | 5/1966 | Meldahl . | |
| 3,439,249 | 4/1969 | Brendemuehl | 192/12 D |
| 3,450,910 | 6/1969 | Jaeschke et al. | 192/12 D |
| 3,773,156 | 11/1973 | Nyquist . | |
| 3,896,348 | 7/1975 | Loderer | 318/345 C |
| 3,942,604 | 3/1976 | Black . | |
| 3,955,653 | 5/1976 | Comer . | |
| 4,055,935 | 11/1977 | Malion et al. . | |
| 4,062,135 | 12/1977 | Dobberpuhl . | |
| 4,181,206 | 1/1980 | Seilenbinder . | |
| 4,236,494 | 12/1980 | Fairchild . | |

Primary Examiner—George H. Krizmanich
Attorney, Agent, or Firm—Wells, St. John & Roberts

[57] ABSTRACT

An implement clutch and brake control for portable, engine-operated movable implement tools is described. The implement tool is controlled by a brake and clutch assembly operably connected between the implement tool and an implement engine. The assembly is normally biased as a brake to hold the implement tool stationary and is electrically operable as a clutch to drive the implement tool from the engine. The implement engine powers a voltage source to generate a voltage sufficient to operate the clutch. A "deadman switch" arrangement is operably connected between the voltage source and the clutch and brake assembly. Operator control of the switch maintains an electrical connection between the voltage source and the clutch and brake assembly. Resulting operation of the clutch operably drives the implement tool from the engine. Release of the switch electrically disconnects the voltage source from the clutch, disengaging the implement tool from the engine and engaging the brake to stop the implement tool and hold it stationary. Releasing the switch does not terminate operation of the engine, thereby obviating the need to restart the engine when further operation of the implement tool is desired.

3 Claims, 3 Drawing Figures

IMPLEMENT CLUTCH AND BRAKE CONTROL

TECHNICAL FIELD

My invention relates to safety and control devices for portable engine-operated implements.

BACKGROUND OF THE INVENTION

Portable engine-operated implements such as lawn mowers, chainsaws, hedge clippers, etc. are the cause of many injuries in or about the home. The problem of consumer injury is so severe that consumer safety agencies have enacted safety standards relating to their design.

The most common source of injury is a rotating or reciprocating implement blade. Often, the blades are exposed while in operation or are accessible while in an "idle" condition. One possible safety measure is to provide a braking means for holding the implement blade against motion during an "idle" condition or other standby or nonuse condition. Incorporating a braking system into a portable implement, such as a gasoline powered lawnmower, would diminish the likelihood of severing the implement operator's fingers by accidental contact with an implement blade. Such accidents often happen when the implement is turned off after use and the implement blade is coasting due to blade momentum. The portable engine-operated implement industry has sought such a braking means for portable engine-operated implements. Several braking systems have been developed, all of which have serious shortcomings.

One braking system uses a manual brake. In this system, the engine is started; the operator assumes an operating position with the implement; and a deadman switch is engaged by the operator. The implement clutch is then mechanically engaged with the implement tool and the implement tool is driven by the engine. When the operator releases the "deadman switch", the clutch mechanically disengages the engine from the implement tool, which allows it to brake to a stop. Among the disadvantages of such a system are: (1) the "deadman switch" is easily disabled by using tape, rope or wire to hold it in place; (2) the clutch mechanism is subject to damage by entry of foreign matter during operation; (3) the system is hard to maintain and requires highly trained, certified personnel as well as special tools and equipment; and (4) the clutch is usually stiff, requiring a tiring amount of operator control to keep the "deadman switch" engaged during implement operation.

Another approach to solving the problem of implement tool control is the "engine stop" system. The "engine stop" includes an electric starter for starting the engine, a "deadman switch", and a complicated electrical control system for sensing blade motion. The "deadman switch" terminates operation of the engine to stop implement tool motion each time the "deadman switch" is released by the operator. Among the disadvantages of the "engine stop" approach are: (1) the system requires an expensive and elaborate electrical and mechanical arrangement to start the engine including batteries and a starter motor; (2) it necessitates constant restarting of the engine; (3) the system requires regular and repeated adjustment to keep it in proper operating condition; (4) the resistance of the implement tool to movement on an operating surface is so great that the implement engine often cannot obtain enough speed to start; and (5) the system is easily bypassed to disable the "deadman switch".

A further shortcoming of the "engine stop" system is that the implement tool is active (moving) during startup of the implement engine. This can result in operator injury from inadvertently starting the engine while the operator's hands are near the implement blades.

The present system eliminates the excessive manual control required to engage the clutch, eliminates the complicated and expensive electrical system with its electric starter and battery, eliminates the possibility of malfunction due to contamination by foreign debris, eliminates the possibility of tampering to disable the system, and simplifies maintenance for servicing personnel. It makes tool engagement below operating speeds at start up impossible. It prevents tool coasting.

The system uses a sealed electrically operated clutch unit to keep out dirt and debris. Such a clutch unit is more reliable than the open-access mechanical clutches. The electrical clutch is also more positive in operation than the mechanical clutch. It requires less operator pressure on a "Deadman Switch" to operate than does a mechanical clutch.

DISCLOSURE OF INVENTION

In an implement clutch and brake control system, the system including an engine that drives a movable implement tool. A voltage source is powered by the engine. An electrically operated clutch and brake assembly electrically powered by the voltage source is operably connected between the engine and the implement tool.

The clutch and brake assembly is normally biased to a first condition wherein it operates as a brake to hold the implement stationary. The clutch and brake assembly is electrically operable to a second condition wherein it operates as a clutch to operably drive the implement tool from the engine.

The system is controlled by a manually operated electronic switch. The switch is operably connected between a voltage source and the clutch and brake assembly. The switch is changeable between a non-conducting condition wherein the voltage source is electrically disconnected from the clutch and brake assembly and the clutch and brake assembly is biased as a brake to hold the implement tool stationary. The switch is also operable in a conducting condition wherein the voltage source is electrically connected to the clutch and brake assembly.

It is an object of my invention to provide a new and improved implement clutch and brake control wherein the hazards of operating the implement are greatly reduced without a loss of operating convenience or reliability.

BRIEF DESCRIPTION OF THE DRAWINGS

A preferred embodiment of my invention is illustrated in the accompanying drawings, in which.

BEST MODE FOR CARRYING OUT THE INVENTION

My invention is a safety system for portable implements having gasoline engines and movable implement tools. My invention can be used on chainsaws, lawn mowers, tillers, snowblowers, and many other implements. In keeping with the philosophy that a safety device should be as useful as it is reliable I have invented a safety device that is effective, inexpensive, rugged, and seviceable.

Portable implements with gasoline engines typically include power blades or other moving implement tools. Safety criteria of importance in operating such devices usually relate to protecting the operator from contacting the working surfaces of the implement. Most injuries occur when a finger or toe gets in the way of a moving blade or other powered element. The safety criteria, then, should encompass the following: the blade or other powered implement element should not operate during the starting process of the implement engine; the blade or implement element should only be engaged when the operator is prepared to use the implement on its working surface or workpiece; the safety features should be easily operated and foolproof; the safety device should be difficult to tamper with or defeat; the safety device should require constant operation by the operator while the implement is in use; release of the safety device should produce immediate stoppage of blade or implement motion; release of the safety device should not necessitate restarting the implement's engine; and the safety device should not introduce unnecessary and complicated components into the portable, gasoline engine-powered implement.

My invention meets the foregoing requirements. A typical application of my invention would be on a gasoline engine-powered rotary lawn mower. Although one embodiment of my invention would be its incorporation into a gasoline engine-powered rotary lawn mower, it is to be understood that my invention is by no means limited to rotary lawn mowers. Therefore, my invention should be accorded the scope attributable to it as defined by the claims.

Figure 3:
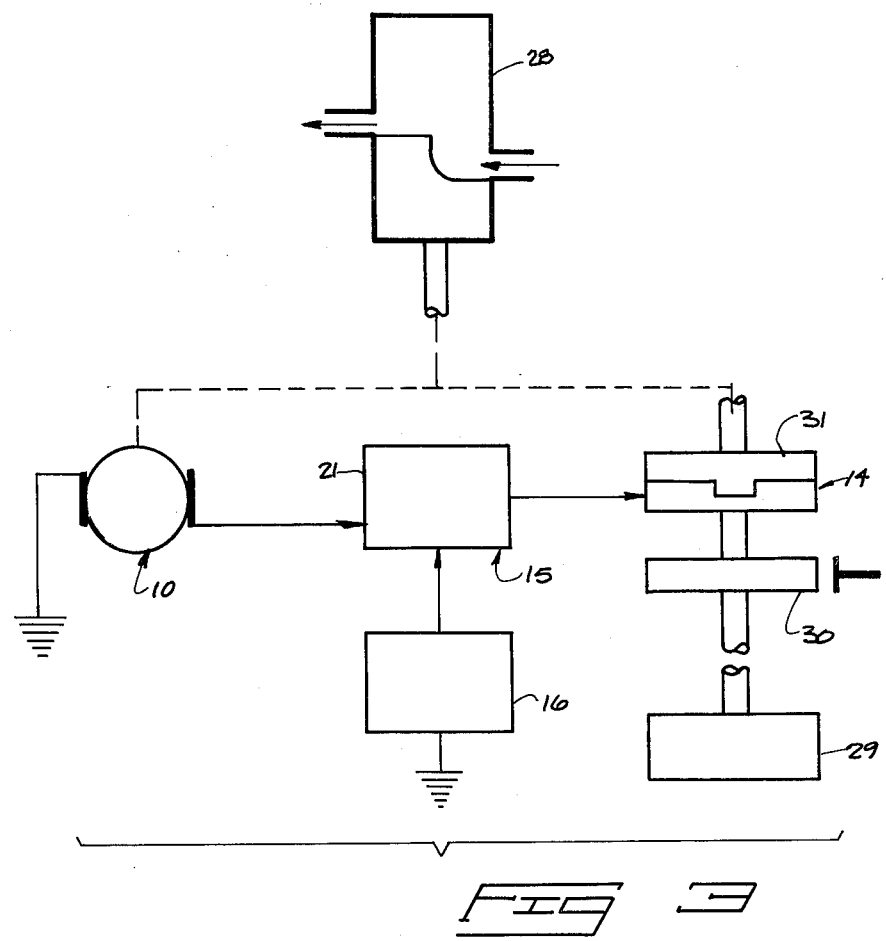
FIG. 3 is a schematic diagram of my invention.

In a rotary lawn mower application, the gasoline engine 28 (FIG. 3) operates an implement 29 (in this case, a blade). A voltage source 10 is powered by the engine 28. The voltage source 10 may be an alternator that generates an alternating current voltage. Between the engine 28 and the implement element 29 is an implement brake and clutch assembly 14. In this embodiment, the electric brake and clutch assembly 14 includes a spring biased brake 30 and an electrically operated clutch 31.

Figure 1:
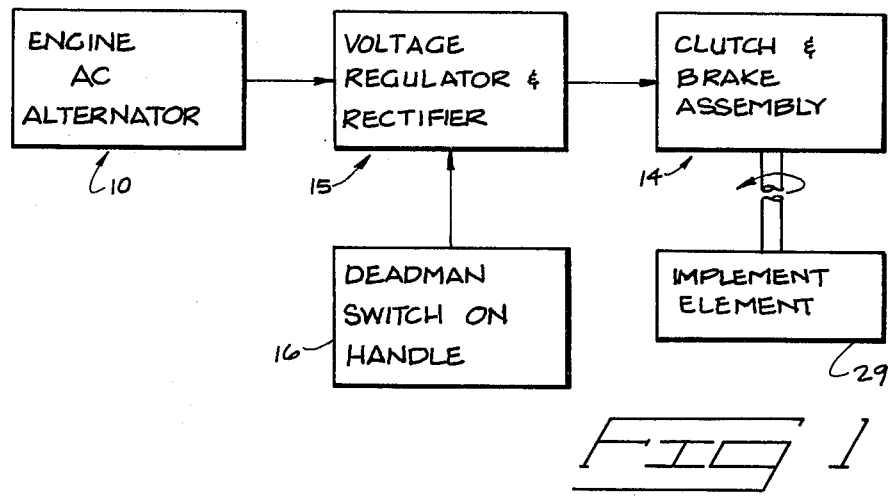
FIG. 1 is a block diagram of my invention.
Figure 2:
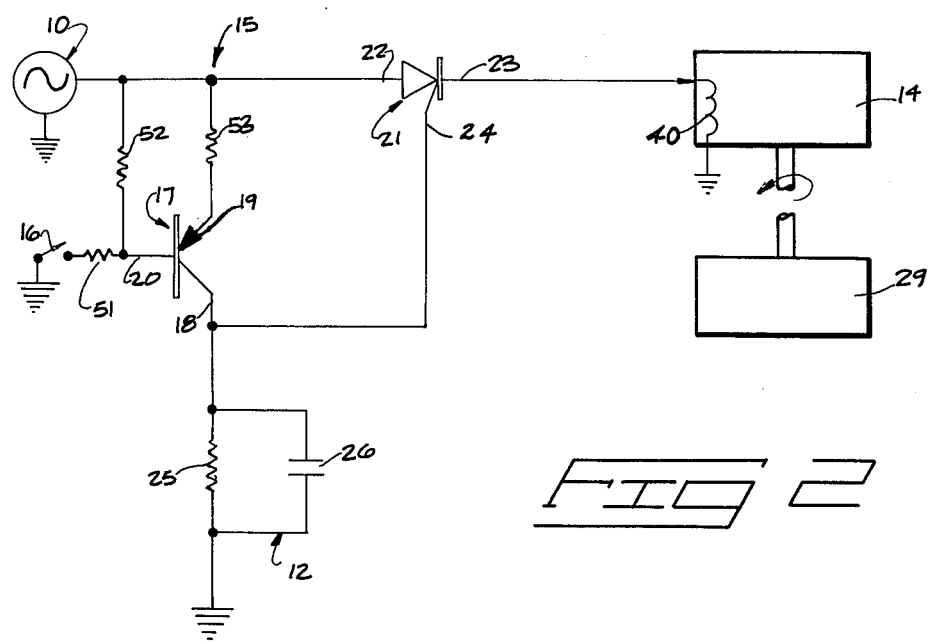
FIG. 2 is a schematic diagram of my invention.

Control of the clutch and brake assembly 14 is effected by an electronic switching means 15 (FIG. 2). The switching means 15 works in conjunction with a deadman switch 16 on the lawn mower's handle. The switching means 15 includes PNP transistor 17, a silicon controlled rectifier (SCR) 21, a resistor 25, biasing resistors 51, 52, and 53, and a capacitor 26.

Electronic switching means 15 is an important feature of the present invention. In this particular embodiment, the voltage source 10 powered by the engine is an alternator, which serves as an engine-powered voltage generating means. The electrically operated clutch and brake assembly 14 has a direct current electromagnetic winding 40 for operating the clutch 31 and simultaneously releasing the spring-biased brake 30. The AC to DC combination between alternator 10 and clutch 31 makes tampering with the safety device difficult. A jumper wire from the alternator 10 to the clutch and brake assembly 14 would not successfully operate the clutch.

SCR 21 converts the AC voltage from the alternator 10 to a DC voltage for operation of the electric clutch and brake assembly 14. In the present embodiment, the anode 22 and the cathode 23 of the SCR 21 are connected between the engine-powered AC alternator 10 and the electrically operated clutch and brake assembly 14.

PNP transistor 17 has an emitter 19 and a collector a18. Transistor 17 has a dual function of rectifying the AC voltage from the AC alternator 10 to provide a DC voltage on the SCR gate 24 and of being electronically responsive to operation of the deadman switch 16.

Resistor 25 and capacitor 26 are a voltage regulating circuit for smoothing the pulsating direct current. Together with resistors 51, 52, and 53, they form a voltage divider circuit. When switch 16 is closed, the transistor base 20 is grounded (to the implement chassis) and transistor 17 conducts. A voltage drop across resistors 25 and 53 is developed by conduction of transistor 17. The transistor collector 18 is connected to SCR gate 24 and the voltage dropped across resistor 25 triggers the SCR 21, causing it to conduct.

An important feature of my invention is the requirement that voltage generated at the alternator 10 be at a predetermined level before the SCR 21 can be triggered. Until engine speed increases to the threshold at which this voltage is generated, the deadman switch 16 might be closed, but the clutch 30 would not be operable. Only when the engine is turning fast enough to be considered at operating speed is the voltage developed by the alternator 10 sufficient to trigger SCR 21 and thereby activate the clutch 30. In this embodiment, a 20 ampere alternator produces sufficient voltage to operate the clutch only when the engine has reached an operating speed of approximately 2200 rpm.

The "threshold" requirement for clutch operation is particularly important when the engine is turned off, the deadman switch is held closed by the operator (or by taping or other tampering), and momentum of the blade continues spinning the motor. As the motor continues spinning, the alternator 10 would continue to generate a voltage that keeps clutch 31 activated. In such a situation, even though the lawn mower is turned off, the blade would continue to revolve. The operator, thinking the blade was stopped when the engine stopped, could be injured by bringing his hand or foot into contact with the still spinning blade.

With the requirement that the engine must be at operating speed to trigger the SCR 21 and engage the clutch 31, the possibility of the blade turning after the engine is turned off is eliminated. Even if the deadman switch 16 is tampered with, turning off the engine results in engine speed dropping below the "threshold" level for operating the clutch and instantly disengages the clutch 31 and engages the brake 30. By this means, injuries caused by a coasting blade are eliminated.

To prevent tampering, the electronic switching means 15 can be encapsulated or otherwise sealed. Attempts to put a jumper around the switch 16 or switching means 15 to defeat its operation will prove unsuccessful because an AC power source will not operate a DC clutch and brake assembly.

In operation, the operator starts the engine 28. The alternator 10 then generates an AC voltage corresponding to the speed of operation of the engine. As the engine turns faster, the alternator 10 is turned faster, generating a higher voltage. Until the operator grasps the lawn mower handle and actuates deadman switch 16, the engine continues turning freely and no current flows through the SCR 21 to the clutch and brake assembly.

The spring biased brake 30 maintains the implement element 29 in a stationary condition.

When the operator closes the deadman switch 16 on the mower's handle (not shown), the voltage generated by the alternator 10 is connected to the clutch and brake assembly 14. If the generated voltage is at or above the threshold value, it actuates electric clutch 31 to couple implement 29 to engine 28. The operator is then able to use the lawn mower.

When the operator releases the deadman switch 16 on the lawnmower's handle, the voltage generated by the alternator 10 is removed from the clutch and brake assembly 14. The electrically operated clutch 31 is de-energized and the springs on the brake assembly 30 cause brake 30 to engage the implement 29. Thus, the engine 28 is immediately disengaged from the implement 29 and the implement 29 is immediately brought to a stop.

It is contemplated that other applications for my invention are possible. The following claims are to be the sole definitive statement of the scope of my invention.

I claim:

1. An engine operated implement having a clutch and brake control, comprising:
   an internal combustion engine having a rotatable output shaft;
   a movable implement tool;
   an alternator operatively powered by the engine output shaft;
   a direct current-operated clutch and brake assembly operatively connected to both the engine output shaft and the movable implement tool for alternate operation as a clutch coupling the implement tool to the engine output shaft or as a brake releasing the implement tool from the engine output shaft and preventing movement of the implement tool, said clutch and brake assembly being normally biased to a first condition where it operates as a brake and being electrically shiftable by direct current to a second condition wherein it operates as a clutch;
   controlled rectifier means operably connected between the alternator and the clutch and brake assembly for selectively converting alternating current produced by the alternator in response to engine operation to direct current for operation of the clutch and brake assembly; and electronic switching means operably connected between the alternator and said controlled rectifier means for enabling current flow through said controlled rectifier means when the voltage at the alternator is at or above a predetermined threshold voltage which results from engine operation at the normal engine speed required to power the implement tool.

2. The implement of claim 1, further comprising:
   deadman switch means operatively connected to said electronic switching means for normally preventing current flow through the controlled rectifier means unless the deadman switch means is activated.

3. The implement of claim 1, wherein the controlled rectifier means includes an enabling gate;
   said electronic switching means including a transistor having a base operably connected to the electrical output of the alternator, the collector and emitter of the transistor being included in a voltage dividing circuit leading to the gate of the controlled rectifier means;
   operation of the transistor being determined by the voltage applied to its base by operation of the alternator, which in turn controls operation of the controlled rectifier.

* * * * *